United States Patent
Utagawa et al.

(10) Patent No.: US 7,916,184 B2
(45) Date of Patent: Mar. 29, 2011

(54) MOVING IMAGE PROCESSING APPARATUS AND METHOD FOR ACQUIRING MOVING IMAGE DATA AND PERFORMING DISPLAY CONTROL

(75) Inventors: Yuka Utagawa, Kamakura (JP); Masahiko Takaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 11/742,744

(22) Filed: May 1, 2007

(65) Prior Publication Data
US 2007/0260985 A1  Nov. 8, 2007

(30) Foreign Application Priority Data
May 2, 2006  (JP) .................. 2006-128580

(51) Int. Cl.
*H04N 5/76* (2006.01)
*H04N 7/18* (2006.01)
(52) U.S. Cl. .................... 348/231.6; 348/143
(58) Field of Classification Search .......... 348/141, 348/142, 231.3, 231.5, 231.6
See application file for complete search history.

(56) References Cited

U.S. PATENT DOCUMENTS

| 6,208,379 | B1 * | 3/2001 | Oya et al. ............... 348/211.11 |
| 6,700,999 | B1 * | 3/2004 | Yang ............................ 382/118 |
| 6,970,510 | B1 * | 11/2005 | Wee et al. ................ 375/240.2 |
| 7,417,672 | B2 * | 8/2008 | Nakajima et al. ......... 348/231.3 |
| 2005/0270371 | A1 * | 12/2005 | Sablak ...................... 348/143 |
| 2006/0195858 | A1 | 8/2006 | Takahashi et al. |

FOREIGN PATENT DOCUMENTS

| JP | 2002-262138 | 9/2002 |
| JP | 2006-042249 A | 2/2006 |
| WO | 2004/095374 A1 | 11/2004 |

OTHER PUBLICATIONS

Office Action issued on Nov. 7, 2008, concerning Chinese Patent Appln 2007100974013 in Chinese with English translation.

* cited by examiner

*Primary Examiner* — Sinh Tran
*Assistant Examiner* — Albert H Cutler
(74) *Attorney, Agent, or Firm* — Canon U.S.A., Inc. I.P. Division

(57) ABSTRACT

A moving image processing apparatus includes an acquisition unit adapted to acquire moving image data captured with an image capturing unit and image capturing information of the image capturing unit associated with each image frame constituting the moving image data; and an addition unit adapted to add marker information for performing display control of a marker display to the moving image data, in association with an image frame that has been designated from the moving image data.

12 Claims, 12 Drawing Sheets

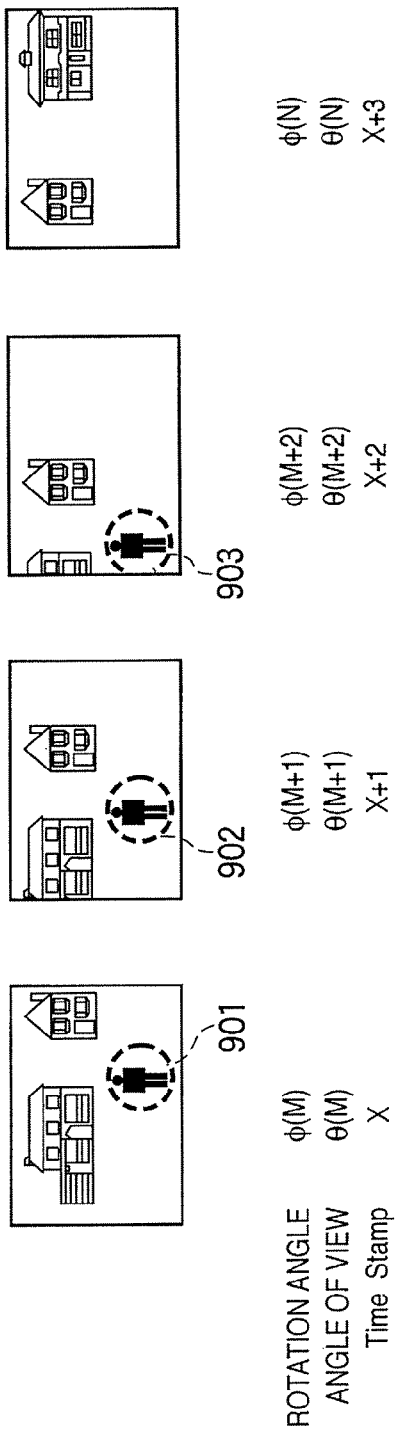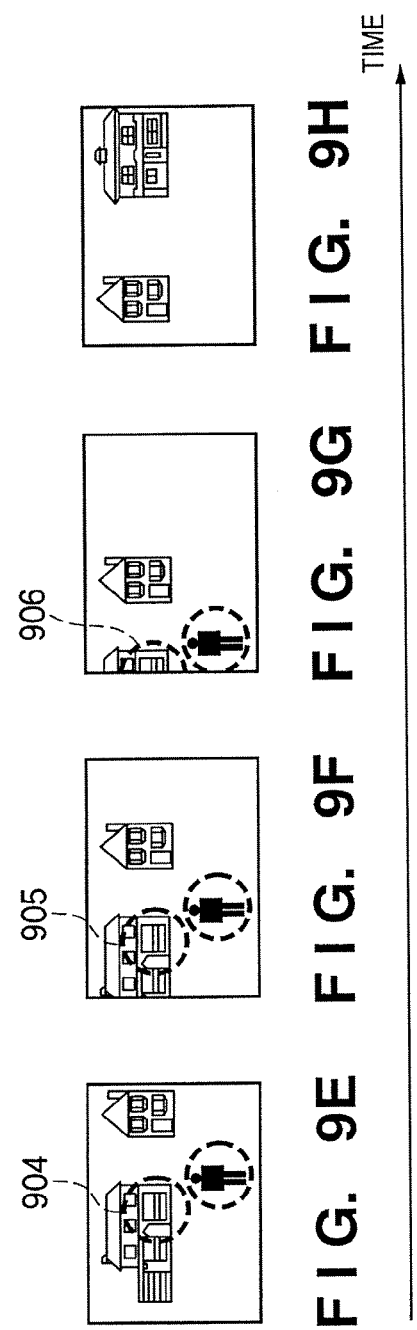

MOVING IMAGE PROCESSING APPARATUS AND METHOD FOR ACQUIRING MOVING IMAGE DATA AND PERFORMING DISPLAY CONTROL

BACKGROUND OF THE INVENTION

1. Field of the Invention

The present invention relates to technology for processing a moving image.

2. Description of the Related Art

With the advancement of image capturing technology using digital cameras or the like and the current social trend, so-called monitor cameras have become widespread that capture a moving image with the purpose of monitoring or status confirmation, and record that moving image as digital data. Communication cameras employing the same technology have also become widespread. Such cameras are fixed in a location according to their purpose, and are often provided with a function for the camera to rotate according to a rotational axis, or to enlarge or reduce using a zoom function. Changes in the image capturing position (direction) of such cameras are ordinarily referred to as pan, tilt, zoom, or the like. By performing remotely-instructed operation of this pan/tilt/zoom function via a network or the like, a user can capture, record, and reference an image in a desired direction. On the other hand, with the increased capacity and reduced cost of storage devices, which usually are hard disks and memory cards, it has become possible to adequately record a moving image of a fixed length of time. There has also been a proliferation of various recording formats for moving images by MPEG (the Moving Picture Expert Group) and various manufacturers. One characteristic of recording formats that have recently come into widespread use is that image data (hereinafter, referred to as an "image frame") captured in time-series at a particular instant in time is not simply recorded in order. That is, it has become possible to record, in addition to image frames, information for grouping those image frames and reproduction time (timestamp) information for individual frames, or image capturing time, image capturing parameters, and the like for the whole of the moving image, as metadata. Examples of typical recording formats include formats such as QuickTime (registered trademark) format and a format generally called MP4. Such recording formats have comparatively flexible extendibility. For example, with such formats it is possible to also store copyrighted information that changes in time-series along the time axis of the moving image, information about the image capturing apparatus of the whole of the moving image, or the like.

For example, in a monitor application or the like, in particular, technology is necessary for extracting or selecting a specific region in time or space from a moving image that has been captured. This is because there are often cases in which it is necessary to selectively perceive a target portion with various conditions, such as when there is a change in the image from the ordinary state. From such a background, conventionally, schemes have been put into practical use in which, with the object of monitoring, when movement is detected in an image frame, a marker is added to the moving image that is captured and recorded. Specifically, a function has been put into practical use in which, in a format in which each image frame or a group constituted from a plurality of image frames is specified, a flag that indicates abnormality is established, and when reproduction is performed, this flag is referenced and only the frames with this flag are emphasized.

Alternatively, schemes have been put into practical use in which, by operating a pointer input apparatus such as a mouse while referring to the image captured and recorded, image information such as a rectangle is clearly overwritten and recorded on an image frame whose recording is complete or a plurality of image frames including the previous and subsequent image frames.

Further, technology is known in which by adopting technology to extract a specific region from the captured image, a specific region is extracted from the moving image by extracting a human being or a moving car. Also, technology is known in which by adopting the above technology, the pan/tilt/zoom function is operated based on the position and size within the captured range of the specific region that has been extracted (for example, see Japanese Patent Laid-Open No. 2002-262138).

In the prior art, when a specific region in space is selected from a moving image that has been recorded or a moving image that will attempt to be captured and recorded, and the selected region is stored associated with moving image data across the entire moving image, there are the problems described below.

In the case of Japanese Patent Laid-Open No. 2002-262138, based on a specific region of an image that has been recorded or is being recorded, it is possible to operate the camera independent of this image. However, it is a problem to retroactively select a specific region in space from a moving image and record it associated with an image that has been recorded in the past.

The present invention was made in consideration of the problems in the prior art described above, and it is an object thereof to provide technology that allows a specific region in space to be associated based on individual image frames of a moving image and position information such as the direction and angle of view when those image frames were captured.

SUMMARY OF THE INVENTION

Embodiments of the present invention are provided to overcome the above-described drawbacks of the related technology.

According to an aspect of the present invention, an embodiment is directed to a moving image processing apparatus, comprising:

an acquisition unit adapted to acquire moving image data captured with an image capturing unit and image capturing information of the image capturing unit associated with each image frame constituting the moving image data; and an addition unit adapted to add marker information for performing display control of a marker display to the moving image data, in association with an image frame that has been designated from the moving image data.

According to the present invention, it is possible to associate a specific region in space based on individual image frames of a moving image and position information such as the direction and angle of view when those image frames were captured.

Further features of the present invention will become apparent from the following description of exemplary embodiments with reference to the attached drawings.

BRIEF DESCRIPTION OF THE DRAWINGS

FIGS. 9A to 9H show display examples of a display based on moving image data;

DESCRIPTION OF THE EMBODIMENTS

Following is a description of preferred embodiments of the present invention with reference to the attached drawings.

First Embodiment

Figure 1:
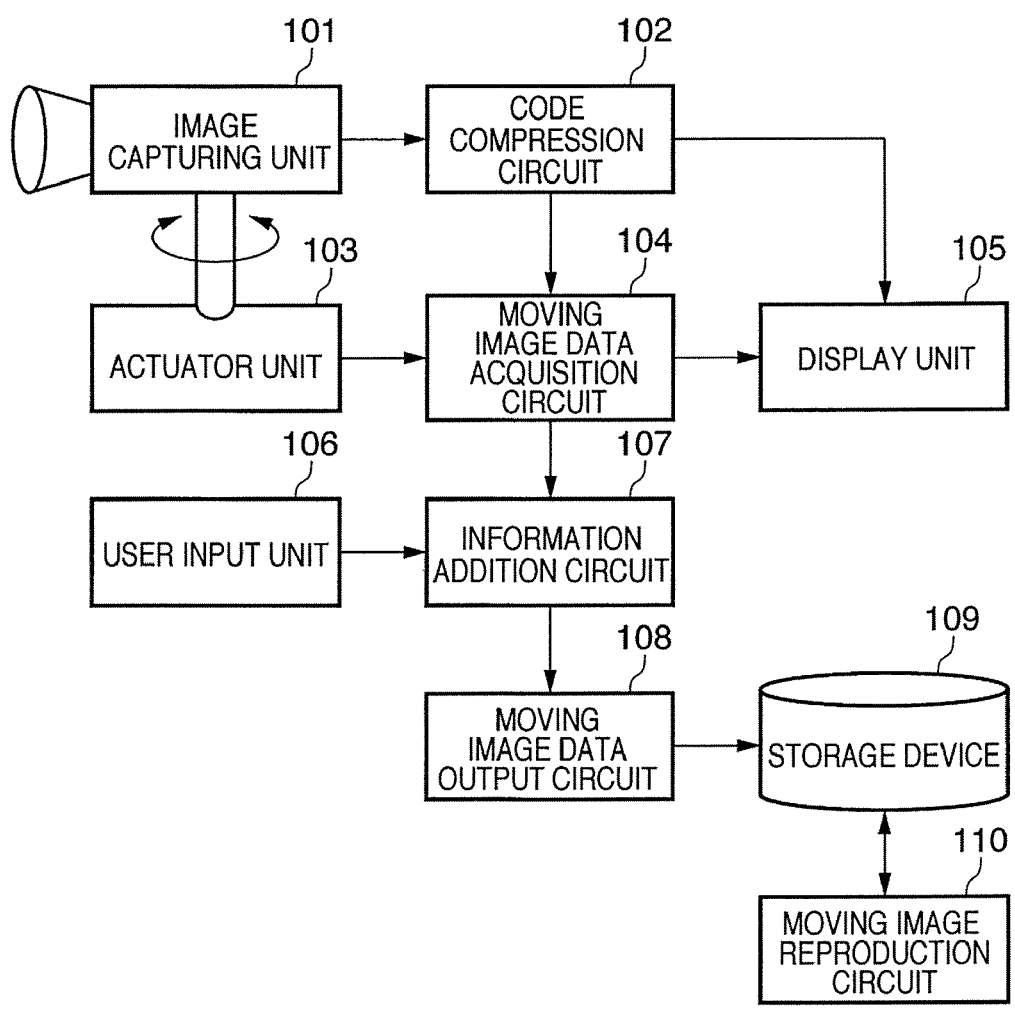
FIG. 1 is a block diagram showing the functional configuration of a moving image processing apparatus according to an embodiment of the present invention.

FIG. 1 is a block diagram showing the functional configuration of a moving image processing apparatus according to an embodiment of the present invention. The moving image processing apparatus according to this embodiment is provided with an image capturing unit 101, a code compression circuit 102, an actuator unit 103, a moving image data acquisition circuit 104, and a display unit 105. The moving image processing apparatus is further provided with a user input unit 106, an information addition circuit 107, a moving image data output circuit 108, a storage device 109, and a moving image reproduction circuit 110.

Each functional configuration realizes image processing according to an embodiment of the present invention in cooperation with a software program that operates under the control of a CPU 252.

The image capturing unit 101 is ordinarily configured from an optical lens or an optical sensor such as a CCD or the like. The image capturing unit 101 outputs the image of each captured frame to the code compression circuit 102 as an image signal. The code compression circuit 102 performs A/D conversion of the image signal input from the image capturing unit 101, and acquires this image signal as image data. Then, compression encoding processing is performed for this image data. Formats such as MPEG-4 are widely known as compression encoding formats for moving images that are continuous video.

The code compression circuit 102 is not absolutely necessary, but the data quantity of moving image data is generally very large, and it is ordinary, for example, to perform compression encoding in a moving image processing apparatus.

The actuator unit 103 controls the image capturing direction by, for example, rotating the image capturing unit 101. This mechanism, for example, can be used as a configuration employed with a fixed installation location, with a purpose of monitoring, remote confirmation, or the like. For example, a configuration having a function to rotate the camera while fixed to a tripod or the like is also applicable. The most typical examples of a mechanism for rotating are, for example, a panning mechanism that rotates in the horizontal direction, a tilt mechanism that rotates in the vertical direction, and the like.

The moving image data acquisition circuit 104 acquires encoded data encoded by the code compression circuit 102, and encoding parameters accompanying encoding. At this time, the moving image data acquisition circuit 104 acquires the data in association with addition information such as the focal distance when image capturing was performed by the image capturing unit 101, time information (a timestamp) for individual frames of image data of the moving image, and information of the rotation angle, angle of view, or the like of the image capturing unit 101.

The display unit 105 displays the moving image acquired by the moving image data acquisition circuit 104. FIG. 1 shows a configuration in which data is acquired also from the code compression circuit 102 such that the image is displayed prior to being encoded by the code compression circuit 102 in order to reduce the amount of processing. Also, because this sort of data flow depends on implementation, encoded data may be displayed after being decoded.

The user input unit 106, for example, is configured such that a user performing operation while referring to the display unit 105 gives actual operating instructions. Instructions are typically given using a mouse, a keyboard, or the like.

The information addition circuit 107 can transform the information input from the user input unit 106, for example such as conversion into metadata, and add the result of transformation to the moving image data. The information input from the user input unit 106 is information for performing display control of the position, size, shape, and the like of the added display added to the moving image data (below, this information is also referred to as "marker information").

The moving image data output circuit 108 outputs final moving image data to a predetermined output destination based on the captured image information associated with the moving image data and the marker information added by the information addition circuit 107. With respect to recording and safekeeping of the moving image data, as a recoding medium of the moving image processing apparatus, it is possible to record and keep the moving image data on a memory card, a fixed disk, or the like that can function as a storage device. Here, the storage device 109 is cited as a medium on which the moving image data can be recorded and kept. The storage device 109 can be built into the moving image processing apparatus. Also, the storage device 109 can be configured to be connected to the moving image processing apparatus via a desired interface (such as USB, IEEE 1394, or the like) or a network (such as a wired Ethernet LAN or a wireless LAN such as IEEE 802.11x or the like).

The moving image reproduction circuit 110 can read moving image data recorded to the storage device 109, and perform decoding processing and reproduction processing of the moving image data. At this time, when marker information (for example, 404 in FIG. 4) has been recorded in the moving image data, the marker can be displayed when a frame including the marker information 404 is reproduced.

Figure 2:
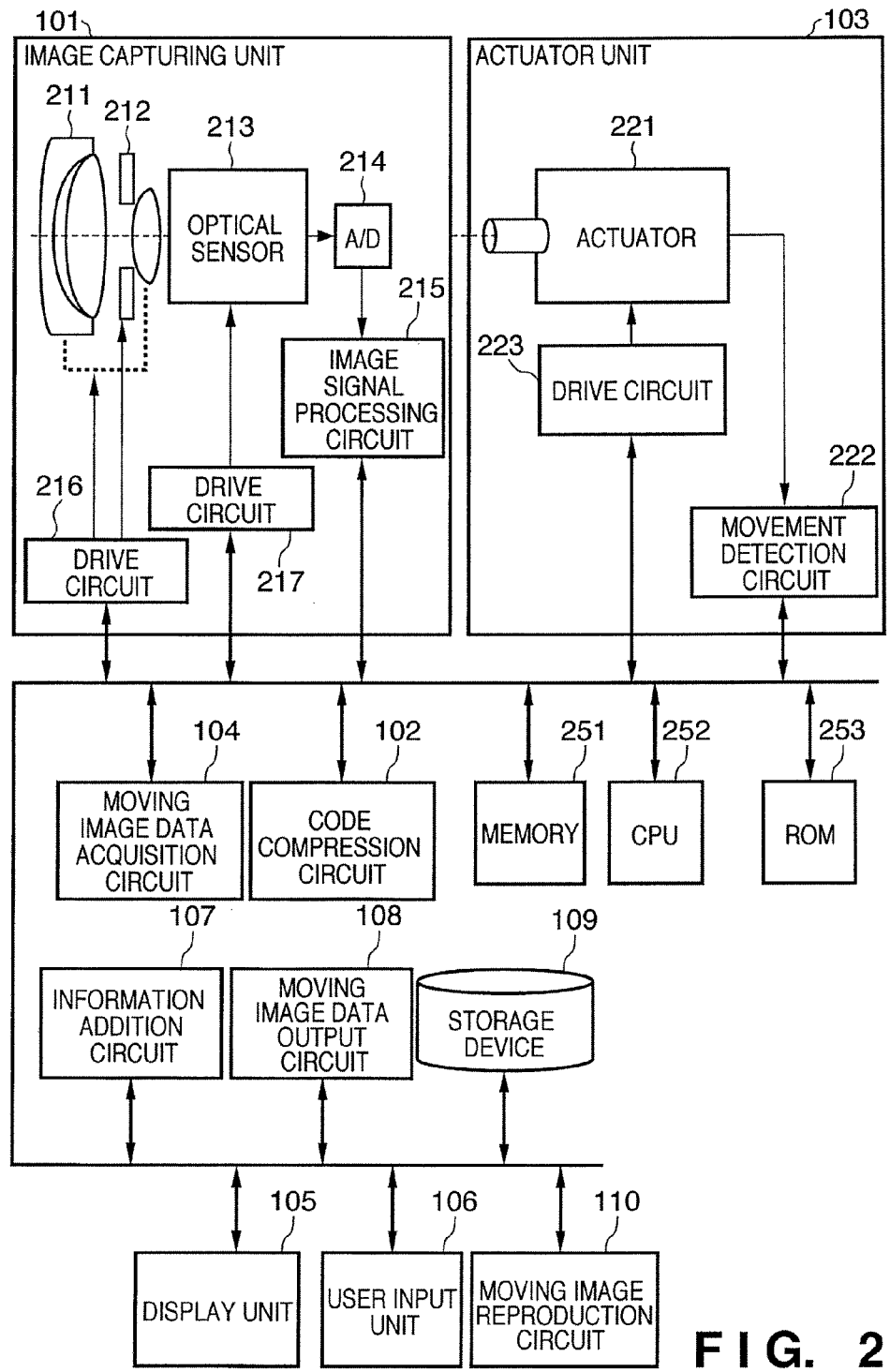
FIG. 2 is a block diagram showing the detailed configuration of a moving image processing apparatus having the configuration shown in FIG. 1.

FIG. 2 is a block diagram showing the detailed configuration of the moving image processing apparatus having the configuration shown in FIG. 1. An image of the image capturing target is formed on an optical sensor 213 through an image capturing lens unit 211 and an aperture unit 212 that are configured by an optical system. The image capturing lens unit 211, for example, is provided with a motor or the like as a drive source for focusing or changing the focal distance for a zoom function, and has a configuration in which a lens group is movable. The aperture unit 212 has a configuration whereby an aperture is controllable. A drive circuit 216 performs operating control of the image capturing lens unit 211 and the aperture unit 212. Accordingly, with the drive circuit 216 appropriately controlling the image capturing lens unit 211 and the aperture unit 212, the amount of light that reaches (forms an image on) the optical sensor 213 is appropriately adjusted. The optical sensor 213 is configured with a solid-state image sensing device (for example, a CCD or CMOS sensor, or the like), so that the incident light can be converted to an electrical charge and accumulated according to the light quantity. The optical sensor 213 reads the accumulated electrical charge and transmits the accumulated electrical charge to an A/D converter 214 as an image signal.

Here, the operation of the optical sensor 213 is appropriately controlled by a pulse signal or the like output by a drive circuit 217. That is, an operation sequence that reads the charge accumulated in a designated time interval at a designated timing is continued. Thus, continuous images are obtained. The continuous images obtained in this manner are a moving image.

Next, the A/D converter 214 performs A/D conversion of the image signal received from the optical sensor 213, and transmits the converted image signal to an image signal processing circuit 215 as digital data (image data). The image signal processing circuit 215 performs image correction, namely white balance correction and gamma correction, using the image data received from the A/D converter 214. The image data processed and placed in an appropriate format in this manner is then transmitted to the code compression circuit 102.

With respect to the exchange of image data between the processes, for example, a large amount of data can be processed in real time by performing access using a high-speed memory 251 employing a DMA (Direct Memory Access) circuit.

The code compression circuit 102 performs compression encoding of the image data input from the image signal processing circuit 215. By performing compression encoding processing for the image of each frame, compression encoding processing is executed for the moving image. Various compression encoding methods can be used. For example, in a continuous JPEG (ISO/IEC 10918)-encoded (a so-called motion JPEG) image, input RGB image data from the image signal processing circuit 215 is converted to a YC signal constituted from a luminance signal Y and a chroma signal CbCr. After dividing into 8×8 pixel blocks, discrete cosine transformation, quantization, and Huffman encoding processing are performed, and the final compressed image is output. Alternatively, the compression encoding method may use a format such as MPEG-2 (ISO/IEC 13818) or MPEG-4 (ISO/IEC 14496) in which interframe prediction is performed. In this case, motion-compensated prediction, macroblock processing, and the like are performed for one specific image (frame) to be compressed while referring to the previous and subsequent frames, and a compressed image (bitstream) is output in which previous and subsequent image frames rely on each other.

Next is a description of the actuator unit 103. The actuator unit 103, for example, includes an actuator 221 for rotationally moving the image capturing unit 101 with a servo motor, an ultrasonic motor, or the like. Also, the actuator unit 103 includes a drive circuit 223 of the actuator 221, and a movement detection circuit 222 for detecting the amount of movement of the actuator 221. With this configuration, for example, when a request to rotate the image capturing unit 101 has been input from a button or the like implemented in a device on a network or the moving image processing apparatus itself, the CPU 252 detects the input request, and sends an instruction to a drive circuit 223 to perform the instructed rotation. Because the drive circuit 223 controls the actuator 221 based on this instruction, the actuator 221 rotates the image capturing unit 101, to which the actuator 221 itself is connected, the amount of the requested angle of rotation. Also, the movement detection circuit 222 detects the amount of rotation of the actuator 221, and records the detected amount of rotation time at each of predetermined timings. With this sort of operation by the actuator unit 103, it is possible to record the amount of movement of the image capturing unit 101 at each predetermined timing to the memory 251, so it is possible to appropriately refer to the recorded amount of movement. Also, as described above, a configuration is adopted in which the drive circuit 216 controls the image capturing lens unit 211, so same as in a so-called zoom operation that changes the focal length, it is possible to refer to information on the focal length. That is, a configuration may be adopted in which the CPU 252 gives an instruction to the drive circuit 216, and the drive status is recorded to the memory 251.

In this embodiment, the moving image data acquisition circuit 104 can acquire image capturing position information along with a moving image, using the amount of movement recorded to the memory 251.

The moving image data acquisition circuit 104, the information addition circuit 107, the moving image data output circuit 108, the moving image reproduction circuit 110, and the like will later be described in detail with the flow of program operation, so such a description is omitted here.

Operating control of the portions described above is managed by the CPU 252. Further, a program containing operating rules of the CPU 252 is stored in a ROM 253. Accordingly, the CPU 252 executes processing using a program or data stored in the ROM 253, and thus along with performing control of the entire moving image processing apparatus, it is possible to execute the above processing performed by each portion used to configure the moving image processing apparatus.

Next is a description of processing from input of information such as encoding data and encoding parameters, and focal length when an image was captured, angle of rotation, and time information with respect to individual frames of image data of a moving image, until output of moving image data to the storage device 109 via the information addition circuit 107.

Figure 3:
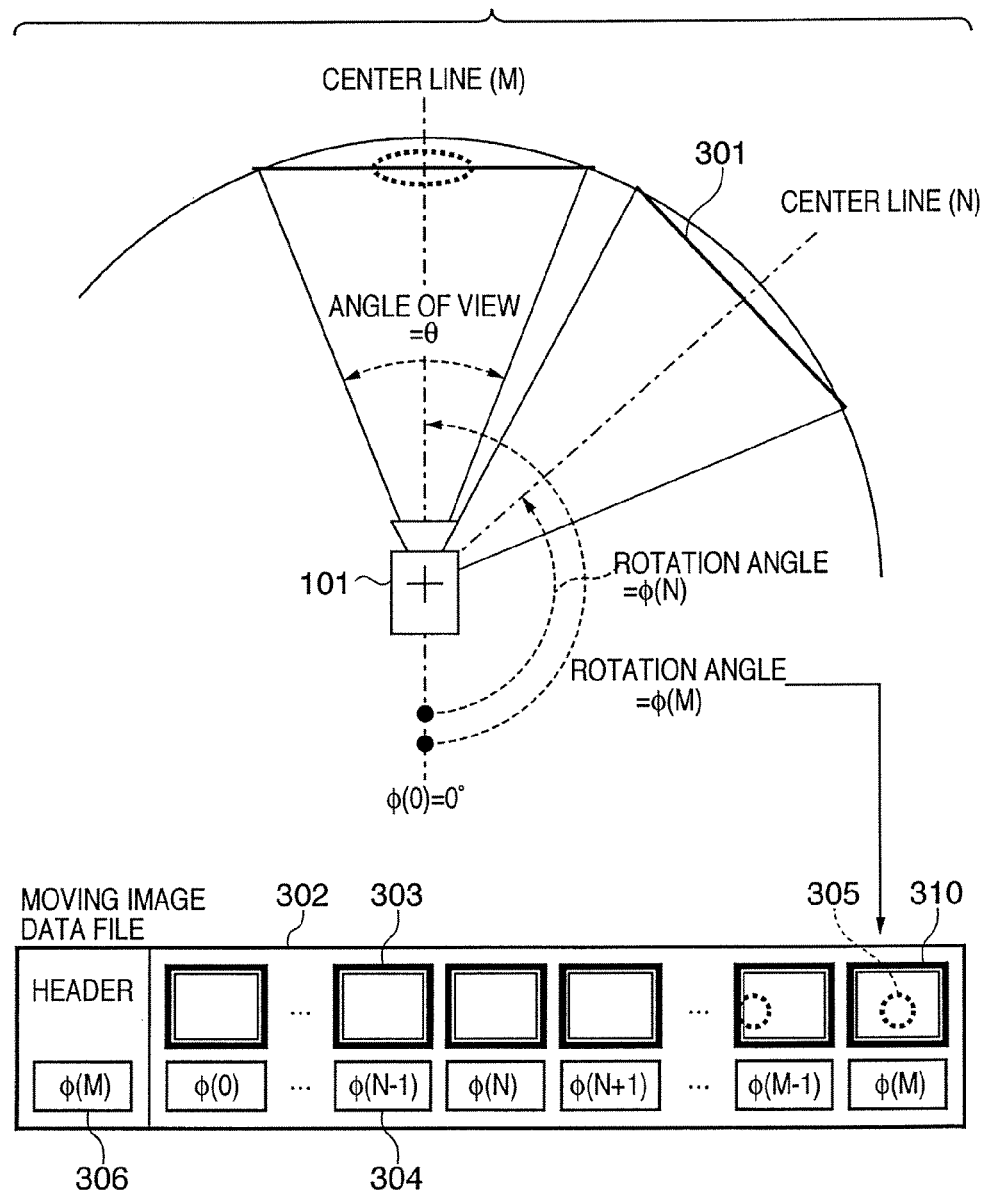
FIG. 3 schematically shows the relationship between the position of an image capturing unit 101 and the file format of moving image data that is ultimately output.

First, in order to facilitate the description of the flow of processing, the format of ultimately output moving image data will be described. FIG. 3 schematically shows the relationship between the position of an image capturing unit 101 and the file format of the moving image data that is ultimately output. First, image capturing information of the image capturing unit 101 such as the focal distance and time information (timestamp) is acquired via the moving image data acquisition circuit 104. In the present embodiment, by way of example, the image capturing information is an angle of view θ and a rotation angle φ. Centered in the image capturing unit 101, the rotation angle is indicated by φ with the directly downward direction in FIG. 3 as a reference (φ(0)=0°), and a prescribed range centered on a lens portion of the image capturing unit 101 is used as an imaginary image sensing plane 301.

Also, when a line extended from the center of the image capturing unit 101 perpendicular to the image sensing plane 301 is used as a center line (M or N in FIG. 3), the rotation angle of the image capturing unit 101 is φ(N) when the center line of the image sensing plane is N. The rotation angle of the image capturing unit 101 is φ(M) when the center line has the image sensing plane of M.

First, when image capturing is performed using the image capturing unit 101 set in the center of FIG. 3, the image capturing unit 101 creates a moving image data file 302. Image capturing information 304 at the time of image capturing acquired based on the pan/tilt/zoom operation related to each image frame 303 included in the moving image data file 302 is output from the actuator unit 103. The image capturing information 304 is recorded as metadata of the frame 303 by the moving image data acquisition circuit 104.

On the other hand, in the information addition circuit 107, marker information related to a region designated by a user (a designated region is also referred to as a "marker") via the user input unit 106 is recorded to a moving image data file (moving image data). With respect to determination of which frames include the designated region, a method is conceivable in which a frame having a center line including the designated region, or a frame wherein the area in which the designated region is included in the imaginary image sensing plane 301 is large, is determined to be a frame including the designated region.

The method described above is not limited to definitely being able to designate one frame; the image capturing timing of the designated region can also be designated with a timestamp. In that case, a method in which the angle of view θ and the rotation angle φ are recorded in the timestamp can also be given as one example.

With respect to the description of the acquired marker information, for example, in the case of FIG. 3, a marker 305 is designated in a frame 310. In this case, in a header 306 of the moving image data file 302, information is recorded in which a marker is designated in the location of φ(M), which is the rotation angle at the time of image capture. In the present embodiment, an example is described in which the marker information is recorded in the header 306 in the moving image data file 302, but as metadata related to each frame, identification information indicating that a marker has been designated may be recorded in each frame.

Next is a description of the relationship between the marker information shown in FIG. 3 and the file format of the moving image data. As a specific example, the file structure and marker information recording will be described in detail using the MPEG-4 (hereinafter, referred to as "MP4") file format as an example. The MP4 file format is a standard file format for recording MP4-encoded moving image/audio data.

Figure 4:
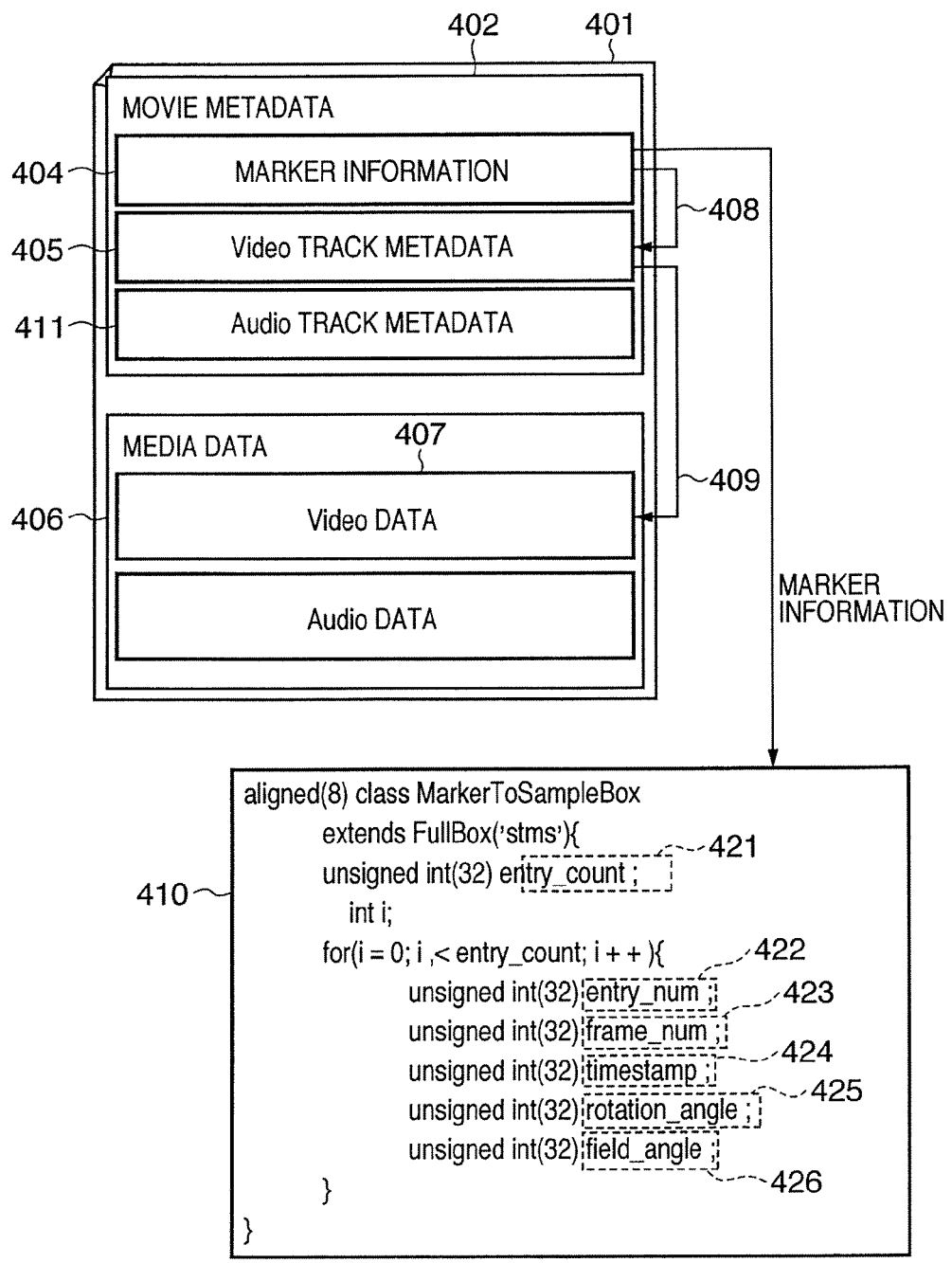
FIG. 4 shows a summary of the structure of an MP4 file 401.

FIG. 4 shows a summary of the structure of an MP4 file 401. The MP4 file 401 is constituted from movie metadata 402 and media data 406. In the movie metadata 402, information indicating the storage location and attributes of the media data 406 are stored. When both video data and audio data are recorded in the MP4 file 401, video track metadata 405, which is a header related to a video track, and audio track metadata 411 are stored.

Encoded data of media streams of video data, audio data, and the like are stored in the media data 406. When, for example, the marker information 404 is recorded in the header of a file, the marker information 404 is stored in the movie metadata 402, which is the storage location, via processing in the information addition circuit 107. From the marker information 404, based on the timestamp recorded therein, it is possible to refer to the metadata in the video track metadata 405 that has the same timestamp (408). Then, the timestamp of each frame is recorded in the video track metadata 405, and it is possible to refer to a frame in video data 407 based on the timestamps recorded from the video track metadata 405 (409). That is, by recording a timestamp for the frame including the designated region in the marker information 404, it is possible to also refer to the media data 406.

Description 410 in FIG. 4 shows an example description of the marker information 404. In the present embodiment, the marker information 404 is added as a desired BOX in the MP4 file 401. A new BOX ("stms") is created in a user space ("udta") in which desired data can be recorded, and marker information is recorded there.

The example description 410 of the marker information 404 includes the variables shown below.

entry_count (421): total number of markers
entry_num (422): marker number
frame_num (423): frame number in which marker is designated
timestamp (424): timestamp of frame in which marker is designated
rotation_angle (425): rotation angle at time of image capturing of frame in which marker is designated
field_angle (426): angle of view at time of image capturing of frame in which marker is designated For example, timestamp (424) is included as a variable in the example description 410 of the marker information 404. By recording such time information as marker information, when designating a specific region in the designation time, it is possible to refer to the corresponding frame based on the input designation time and timestamp value.

The variables (421 to 426) of the above marker information 404 are only one example, and are not required to include all information; the variables may include only a portion of the information. Also, the variables of the marker information 404 are not limited to those described above; it is also possible to describe variables other than those noted above as variables of the marker information 404.

The information addition circuit 107 adds the marker information 404 designated by the user input unit 106 to the moving image data. The moving image data output circuit 108 outputs the moving image data file 302 as shown in FIG. 3, obtained by combining, moving image data, image capturing information, and markers (marker information), to the storage device 109.

Next is a description of the method for instructing recording of the marker information 404 by the user input unit 106. For input of the marker information 404, it is possible to use a method in which, for example, while referring to an image that is displayed in the display unit 105, a user performs instruction on the image using the user input unit 106 configured from a mouse pointer or the like. In the present embodiment, as a simple method for inputting instructions, a case is described in which the user input unit 106 has an interface constituted using buttons, and instructions are given by pushing a button while referring to the display of the display unit 105.

Figure 5:
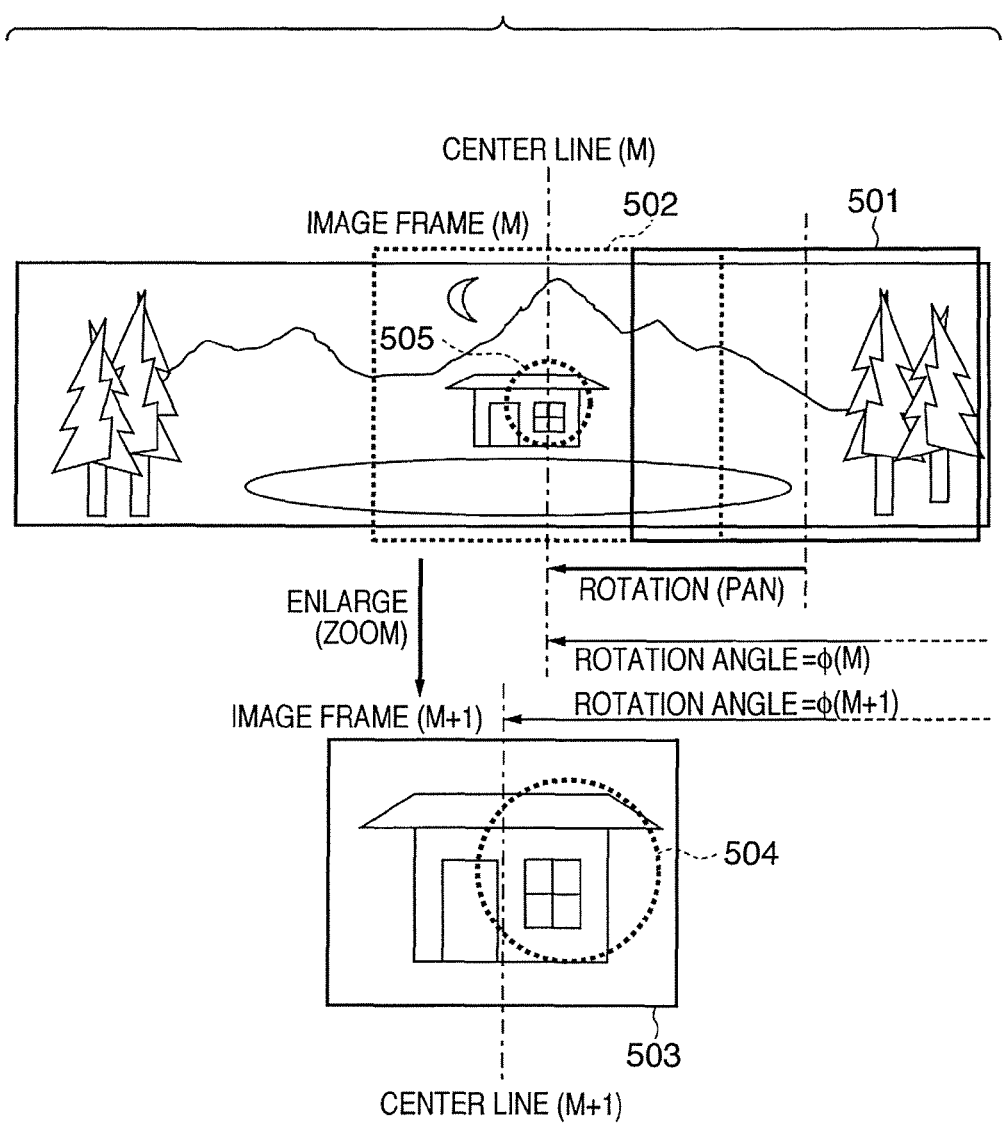
FIG. 5 is a schematic diagram of a frame and a marker, showing a state in which the frame, which is an image of a specific instant of captured moving image data, and marker information that has been superimposed on the frame of that image, have been made visible.

FIG. 5 is a schematic diagram of a frame and a marker, showing a state in which the frame, which is an image of a specific instant of captured moving image data, and marker information that has been superimposed on the frame of that image, have been made visible.

In FIG. 5, three frames (501, 502, and 503) are shown. Frame 501 shows an image frame of an instant that is not specified. Frame 502 shows an image frame (M) of an instant in which the rotation angle of the image capturing unit 101 is φ(M) as a result of the image capturing unit 101 being rotated from the state of the frame 501 by the actuator unit 103.

Further, the frame 503 shows an image frame (M+1) in which the rotation angle is φ(M+1) due to being further rotated slightly from the state of the frame 502, and also enlarged (zoomed). In FIG. 5, for the sake of understanding rotation of the captured image, the center line of each frame is also clearly shown. Circles (504 and 505) drawn with a broken line indicate markers made visible.

When a button (not shown) provided in the user input unit 106 is pushed while referring to the display of the display unit 105, marker information is set to an image frame that is being displayed at the timing of the press. Taking the image frame (M) 502 as an example, marker information is set such that a marker size marker 505 set in advance is displayed in the image frame (M) 502.

Here, the angle of view and the focal distance relative to the image frame 501 in the image frame (M) 502 are θ(M) and f(M), respectively. Also, the angle of view and the focal distance relative to the image frame 501 in the image frame (M+1) 503 are θ(M+1) and f(M+1), respectively. At this time, position information of the image capturing unit 101 associated with each image frame is as follows.

In the position information in the image frame (M) 502, the rotation angle is φ(M), the angle of view is θ(M), and the focal distance is f(M). In the position information in the image frame (M+1) 503, the rotation angle is φ(M+1), the angle of view is θ(M+1), and the focal distance is f(M+1).

Also, in the marker information, the rotation angle is φ(M), the angle of view is θ(M), the focal distance is f(M), and moreover the marker size is S. Here, the marker size S is a value indicating the size of a marker, and for example, a value obtained by converting to the angle of view can be used as the marker size S.

By adding the image capturing information and the marker information to the moving image data, the rotation angle and the angle of view used as marker information are associated with the rotation angle and the angle of view of each image frame, so that it is possible to store the relationship between each frame without inconsistencies.

Figure 6:
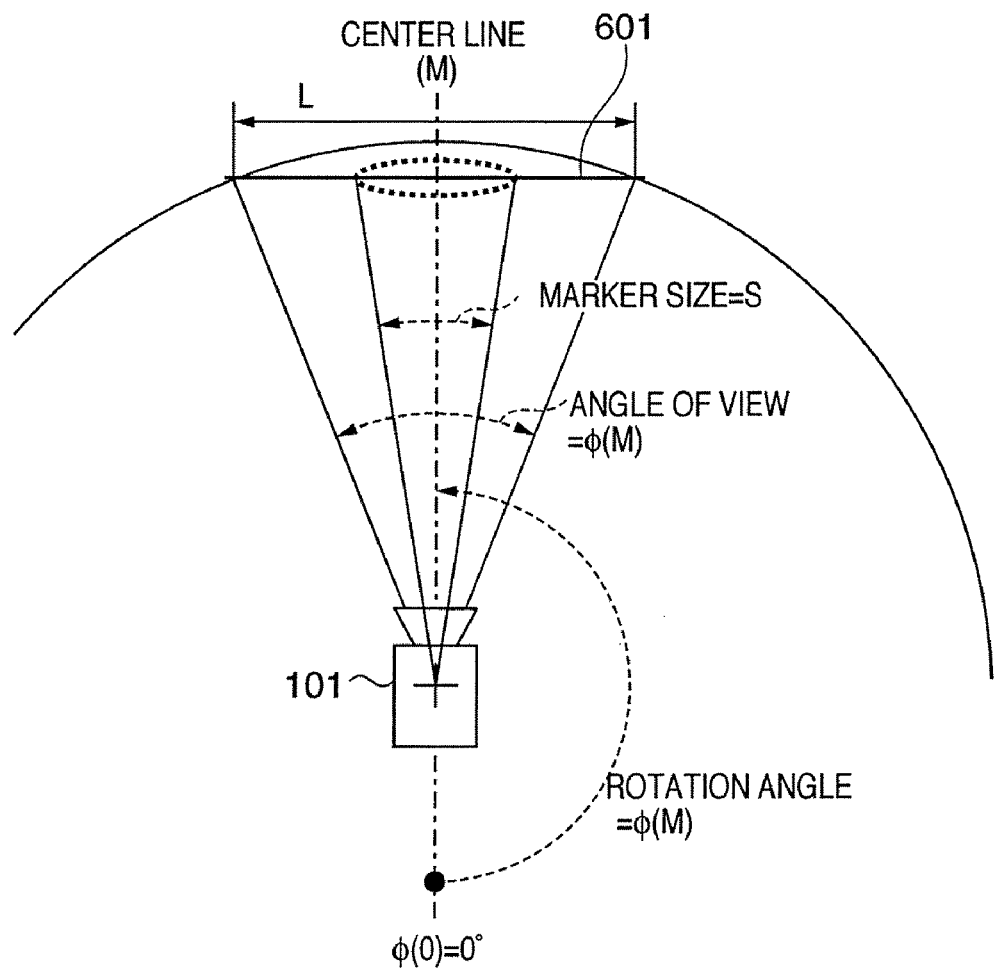
FIG. 6 shows the relationship between an image frame (M) 502 and marker information.

In order to give a more specific description, further, a description of the relationship between markers made visible and image frames will be added with reference to FIG. 6 in addition to FIG. 5. In the image frame (M+1) 503 in FIG. 5, the marker 504 made visible is displayed larger than the marker 505 of the image frame (M) 502. This is because image capturing of the image frame (M+1) 503 is performed enlarged relative to the image frame (M) 502. Attention should be paid to the fact that the instant in which the marker setting instruction was performed by the user input unit 106 is the same instant as the image frame (M) 502. The marker information can be set without relying on a specific image frame. Thus, for example, the angle of view θ(M) in the image frame (M) 502 and the angle of view θ(M) of the marker information are the same, but the angle of view θ(M) in the image frame (M+1) 503 is not necessarily the same. That is, the angle of view θ(M) of the marker information that has been set in the image frame (M) 502 is to be converted by the angle of view θ(M+1) in the image frame (M+1) 503.

FIG. 6 shows the relationship between the image frame (M) 502 and the marker information. As is clear from FIG. 6, in an imaginary image sensing plane 601 in the image frame (M) 502, the width d(M) in the horizontal direction (lateral direction) of the marker made visible is related to the width in the horizontal direction (lateral direction) of the imaginary image sensing plane 601 as L, as follows.

$$d(M)/L=(\sin(S/2))/(\sin(\theta(M)/2)) \quad (1)$$

Here, S is a value obtained by performing angle of view conversion of the marker size described above by way of example. The ratio d(M)/L is a ratio of the marker size to the image frame. If the marker made visible is displayed superimposed on the display unit 105 as shown in FIG. 5, the marker can for example be displayed with the pixel ratio of the display unit 105.

On the other hand, in the image frame (M+1) 503, because the angle of view is the angle of view θ(M+1) due to enlargement, the width d(M) in the horizontal direction (lateral direction) of the marker is as follows.

$$d(M+1)/L=(\sin(S/2))/(\sin(\theta(M+1)/2)) \quad (2)$$

For example, a case is assumed in which S is 5 degrees, θ(M) is 20 degrees, θ(M+1) is 10 degrees, and there are 640 horizontal pixels in a captured image frame. By calculation, it is understood that there are about 161 horizontal pixels in the marker made visible in the image frame (M) 502, and there are about 320 horizontal pixels in the marker made visible in the image frame (M+1) 503. Due to the change from the image frame (M) 502 to the image frame (M+1) 503, the angle of view is approximately halved, and the size of the marker made visible is about doubled.

The above relational expression of the width in the horizontal direction (lateral direction) of the marker made visible and the width in the horizontal direction (lateral direction) of the imaginary image sensing plane 601, when the angle of view is sufficiently small, using a Maclaurin expansion, can be approximated by d/L=S/θ.

Also, in the change from the image frame (M) 502 to the image frame (M+1) 503, the change from the rotation angle φ(M) to the rotation angle φ(M+1) can be for example considered as the change from the center line (M) to the center line (M+1) of the image frame.

Here, in order to avoid mixing the rotation angle φ(M) set as marker information in the image frame (M) 502 with the rotation angle of the image frame (M) 502, φ(m) is adopted as the rotation angle φ(M) used as marker information. Also, ψ is used as the difference in rotation angle between a rotation angle φ(x) of a specific image frame and φ(m). That is, ψ=|φ(x)−φ(m)|.

For example, in the relationship between φ(m)=the rotation angle φ(M) set as marker information in the image frame (M) 502 and the image frame (M+1) 503, ψ=φ(m)−φ(M+1).

Also, θ(x) is used as the angle of view of this specific image frame. Likewise, the angle of view in the case of the image frame (M+1) 503 is θ(x)=θ(M+1).

The center position of the marker made visible where L is the width in the horizontal direction (lateral direction) of the imaginary image sensing plane 601 is expressed with the following expression (3), from a distance r from the center line of the imaginary image capturing plane 601.

$$r/L=(\tan(\psi)/\tan(\theta/2))/2 \quad (3)$$

Also, as a value obtained by converting the marker size S to an angle of view, a distance r1 from the center line of the imaginary image sensing plane 601 to the far side of the marker is expressed with the following expression (4).

$$r1/L=(\tan(\psi-(s/2))/\tan(\theta/2))/2 \quad (4)$$

Likewise, a distance r2 from the center line of the imaginary image sensing plane 601 to the near side of the marker is expressed with the following expression (5).

$$r2/L = (\tan(\psi + (s/2))/\tan(\theta/2))/2 \quad (5)$$

These expressions are always effected by converting the marker size S included in the marker information to an angle of view.

In this manner, by appropriately storing the marker information, it is always possible to use the position of the marker, which has been visualized and is expressed by the marker information, on the imaginary image sensing plane 601.

Position information of the image capturing unit 101 corresponding to each image frame, and marker information corresponding to the position information of the image capturing unit 101 instructed by the user input unit 106, are recorded in the moving image data. With moving image data in which position information and marker information has been recorded, it is possible to acquire the marker display position in frames including a marker, and this is not limited to a moving image frame of the instant in which marker information was recorded. Based on the display position, a marker designated in a particular instant can be displayed in a frame that was recorded at an earlier point in time. Thus, from the individual image frames of a moving image and position information such as the direction and angle of view when that image was captured, it is possible to associate a specific region in space throughout the entire moving image.

In the present embodiment, a technique was described for acquiring image capturing information related to operation of an image capturing unit in the horizontal direction, and recording the acquired information in moving image data, but the same technique may also be used for operation in the vertical direction. That is, by acquiring and recording image capturing information related to movement in the vertical direction, it is possible to specify the position of a marker in the same manner by using the technique described above.

Next is a description of processing performed when, based on moving image data output with the technique as described above, recording image capturing information and marker information in the moving image data, and performing reproduction of that moving image data.

Based on the marker information 404 recorded in the MP4 file 401, the moving image data output circuit 108 creates moving image data in which is recorded the marker information 404 related to the specific region designated by the user at the time of moving image reproduction. That processing will be described using as an example a case in which the marker information such as description 410 shown in FIG. 4 was recorded.

The moving image data output circuit 108 acquires the marker information 404 recorded in the header of the moving image data before reading the media data 406. For example, the moving image data output circuit 108 acquires the total number of markers recorded in the moving image data from the entry_count (421) recorded in the marker information 404. In the example shown in FIG. 5, only one marker is displayed in the frame, but the gist of the present invention is not limited to such a case; a plurality of markers may be designated in a single frame.

The moving image data output circuit 108 acquires a timestamp for each piece of marker information 424, and acquires the frame numbers included in the timestamps. Based on the acquired frame numbers, frames are specified from the moving image data. Then, the region designated by the user is specified based on the rotation angle and angle of view related to the specific region recorded as the marker information 404.

The moving image data output circuit 108 creates moving image data based on the marker information 404 recorded in the MP4 file 401.

The position information of the image capturing unit 101 corresponding to the moving image frames in the moving image data, and the marker information corresponding to the position information of the image capturing unit 101 instructed by the user input unit 106, are recorded without inconsistencies, and output as data that can be reproduced.

The moving image reproduction circuit 110 reads the moving image data recorded in the storage device 109, performs decoding processing, and performs reproduction processing of the moving image data. At this time, when the marker information (404 in FIG. 4) is recorded in the moving image data, it is possible to display the marker when a frame includes the marker information is reproduced.

Figure 7:
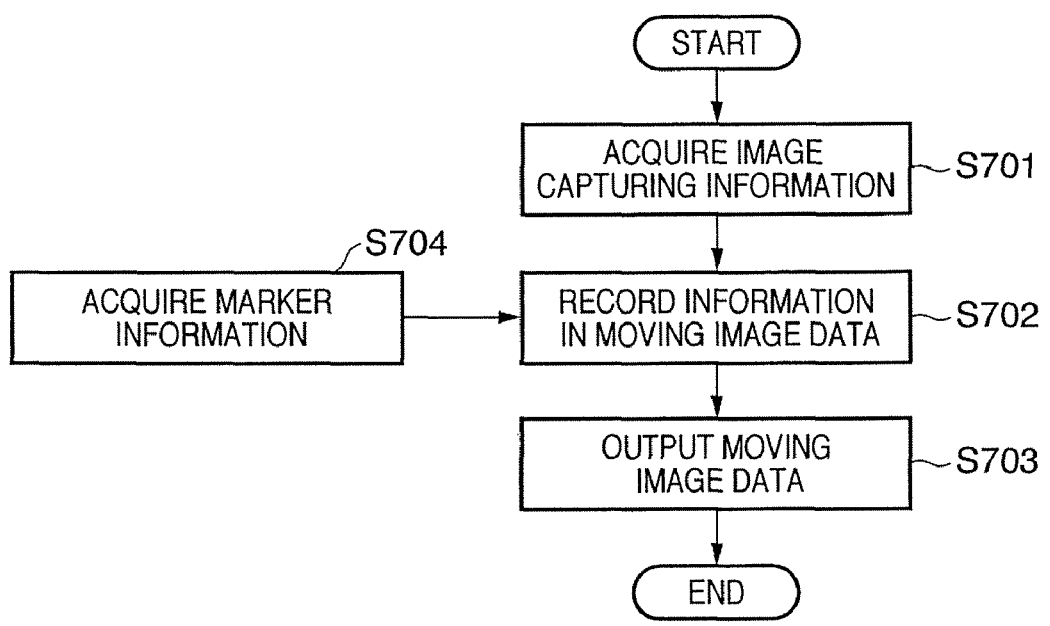
FIG. 7 illustrates the flow of processing from capturing an image of a subject using an image capturing unit to output of moving image data.

Next is a description of the flow of processing described above with reference to flowcharts. First is a description of the flow of processing from capturing an image of a subject using the image capturing unit 101 to output of moving image data, with reference to FIG. 7.

This processing is realized by the cooperation of a software program that operates under the control of the CPU 252 with the moving image data acquisition circuit 104, the information addition circuit 107, the moving image data output circuit 108, and the like.

In Step S701, image capturing information of the image capturing unit 101 such as pan/tilt/zoom acquired with the actuator unit 103 is acquired for moving image data output from the image capturing unit 101. The moving image data output from the image capturing unit 101 is output to the code compression circuit 102. The code compression circuit 102 executes encoding processing based on the moving image data output from the image capturing unit 101, and outputs the encoded moving image data to the moving image data acquisition circuit 104. Also, the actuator unit 103 outputs to the moving image data acquisition circuit 104 information (for example, such as focal distance, time information (timestamp), and the rotation angle and angle of view of the image capturing unit 101 at the time of image capturing) related to the image capturing information of the image capturing unit 101.

In Step S702, the moving image data acquisition circuit 104 records the image capturing information of the moving image data that was acquired by the moving image data destination in prior Step S701. The image capturing information is recorded as information associated with each image frame constituting the moving image data.

Here, when there is an instruction from the user input unit 106 to add a marker display, the information addition circuit 107 acquires information (marker information) for performing display control of the marker display added in image frames constituting the moving image data. Here, the marker information includes, for example, information of any of the rotation angle and the angle of view of the image capturing unit 101 when the position of the marker display was designated. Then, the information addition circuit 107 records (adds) the marker information to the moving image data output from the moving image data acquisition circuit 104 (S702). The information recorded (added) here is added as information that is in the same format as the image capturing information associated with the moving image data, and can be converted.

In Step S703, the moving image data output circuit 108 generates moving image data in which marker information related to the region designated by the user at the time of moving image data reproduction is recorded, and outputs the generated moving image data.

Figure 8:
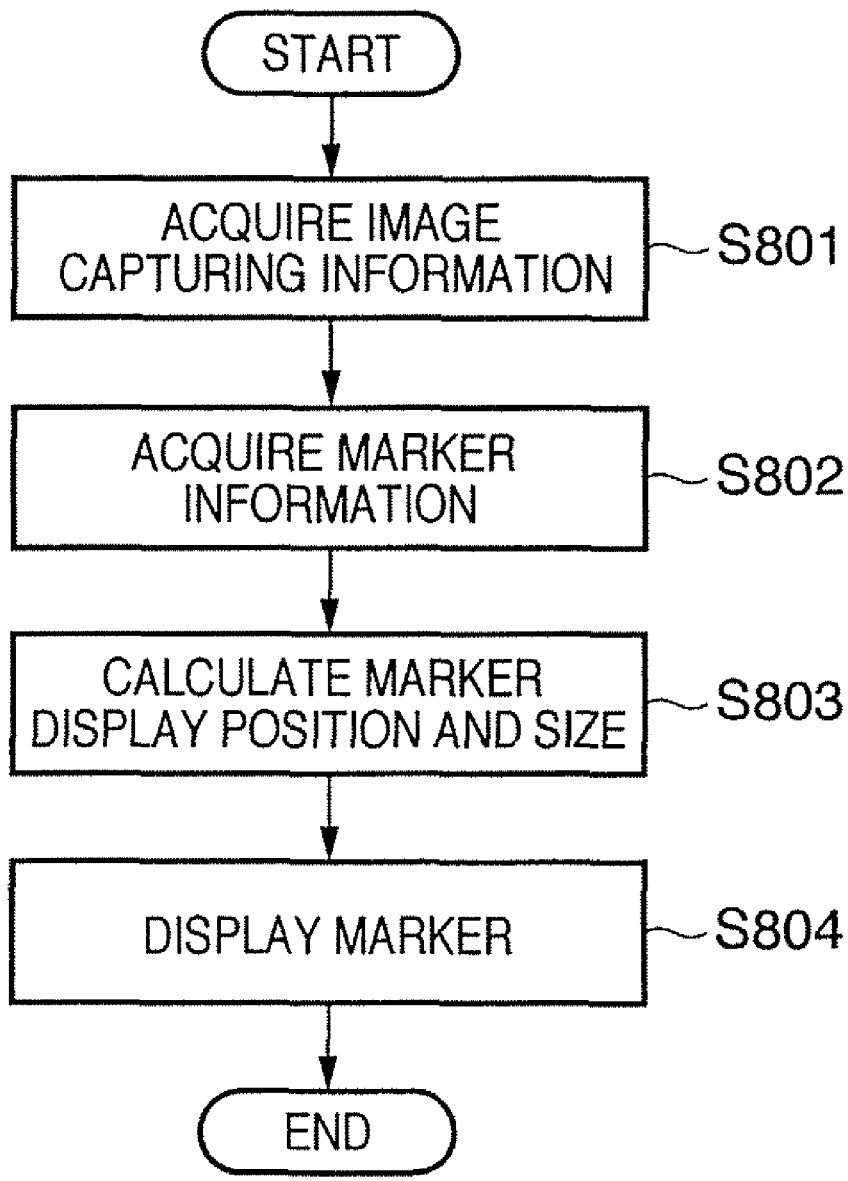
FIG. 8 illustrates the flow of processing to perform reproduction of moving image data for which marker information has been recorded.

Next is a description of the flow of processing to perform reproduction of moving image data for which marker information has been recorded, with reference to the flowchart in FIG. 8. This processing is realized by the cooperation of a software program that operates under the control of the CPU 252 with the moving image reproduction circuit 110 and the like.

In Step S801, the moving image reproduction circuit 110 acquires from the storage device 109 the image capturing information of the image capturing unit 101 for each frame generated by the moving image data output circuit 108 and recorded in the output moving image data.

Next, in Step S802, the moving image reproduction circuit 110 acquires the marker information 404 recorded (added) in the moving image data.

In Step S803, the moving image reproduction circuit 110 calculates the marker display position and size based on the marker information 404 acquired in the previous Step S802 and the image capturing information of each frame (S803).

Then, in Step S804, based on the marker display position and size calculated in the previous step S803, the moving image reproduction circuit 110 displays a marker when an image frame including the marker information 404 is reproduced, and processing ends.

Next is a description of marker display based on the marker position information recorded in the MP4 file 401, performed when a frame including marker information is reproduced.

With respect to the width d(M) in the horizontal direction (lateral direction) of the marker, it was explained that where L is the width in the horizontal direction (lateral direction) of the imaginary image sensing plane 601 shown in FIG. 6, from the relationship in expression (1), a relationship $d(M)/L=(\sin(S/2))/(\sin(\theta(M)/2))$ is realized. Expressing the width d(M) in the horizontal direction of the marker with the relationship in expression (1) modified yields an expression as in expression (6).

$$d(M)=L\times((\sin(S/2))/(\sin(\theta(M)/2))) \quad (6)$$

When taking as an example a case in which SVG (Scalable Vector Graphics) are used for visualization of the marker information, by setting the size of the portion in which a marker is drawn with SVG, it is possible to display an appropriately-sized marker in a designated portion. For example, a case in which a marker is shown as a circle will be described with reference to an example of drawing settings disclosed below. In the drawing settings disclosed below, "circle" indicates a circular drawing, and (cx, cy) indicates the center position (center coordinates) of the circle. The size of the radius of the circle is indicated by "r". Here, the size of the radius is set as "d(M)/2", and converting to diameter, drawing and displaying of a circle with a diameter of d(M) is set. Also, stroke="red" indicates that the color of the circle drawn is set to red.

(Example Drawing Settings)

```
<svg sml:space="default" width="220"
height="200">
    <circle cx="25" cy="25" r="d(M)/2" stroke="red"
stroke-width="1" />
</svg>
```

In the above example of drawing settings, an example is shown of drawing a marker in a circle, but it is also possible for the marker to be displayed not as a circle but as a rectangle.

In this case, by setting "circle", which designates drawing of a circle, to "rect", which indicates drawing of a rectangle, it is possible to draw a rectangular marker with a length of d(M) on one side. Also, in the above example of drawing settings, by setting stroke="red" to, for example, stroke="blue", it is also possible to draw a rectangular marker that is colored blue. By changing the settings for the marker display, it is also possible to make various modifications to the display position, display size, display shape, and display color.

When a frame is displayed zoomed, the moving image reproduction circuit 110 obtains the zoom ratio (or reduction ratio) based on the angle of view, and the size of the marker can be adjusted (set) based on that value. The moving image reproduction circuit 110 can adjust (set) the size of the marker, and display the marker whose size has been adjusted (set) in the image frame displayed zoomed (displayed reduced). By describing the marker in this manner using vector graphics such as SVG, flexible compatibility is also possible in a case in which it is necessary to change the size of a marker to be displayed with an operation such as zooming.

The present invention may also be adopted in a camera designed so as to allow the same operation as a physical pan/tilt/zoom operation, in which pan/tilt/zoom can be performed electronically.

As described above, according to the present invention, from individual image frames of a moving image and position information such as the direction and angle of view when image capturing was performed, it is possible to associate a specific region in space throughout an entire moving image.

Second Embodiment

Next is a description of a second embodiment of the present invention with reference to FIGS. 9A to 9H, 10A and 10B, and 11. Constituent elements shared with the first embodiment are described using the same reference numerals, and duplicate description is omitted. In the present embodiment, using the configuration shown in FIG. 1, moving image data to which image capturing information and marker information have been added is generated and stored in the storage device 109.

A moving image of a subject is captured by the image capturing unit 101, and an image of each captured frame is output to the code compression circuit 102 as an image signal. The code compression circuit 102 performs A/D conversion of the image signal input from the image capturing unit 101, and acquires this image signal as image data. The moving image data acquisition circuit 104 acquires encoded data encoded by the code compression circuit 102, and encoding parameters accompanying encoding. At this time, the moving image data acquisition circuit 104 acquires the data in association with the focal distance when image capturing was performed by the image capturing unit 101, time information (a timestamp) for individual frames of image data, and information of the rotation angle, angle of view, or the like of the image capturing unit 101. The information addition circuit 107 performs transformation of information for performing display control of an added display (marker) input by the user input unit 106, for example such as conversion into metadata, and adds the result of transformation to the moving image data. The moving image data output circuit 108 outputs the final moving image data transformed by the information addition circuit 107 to the storage device 109.

Figure 11:
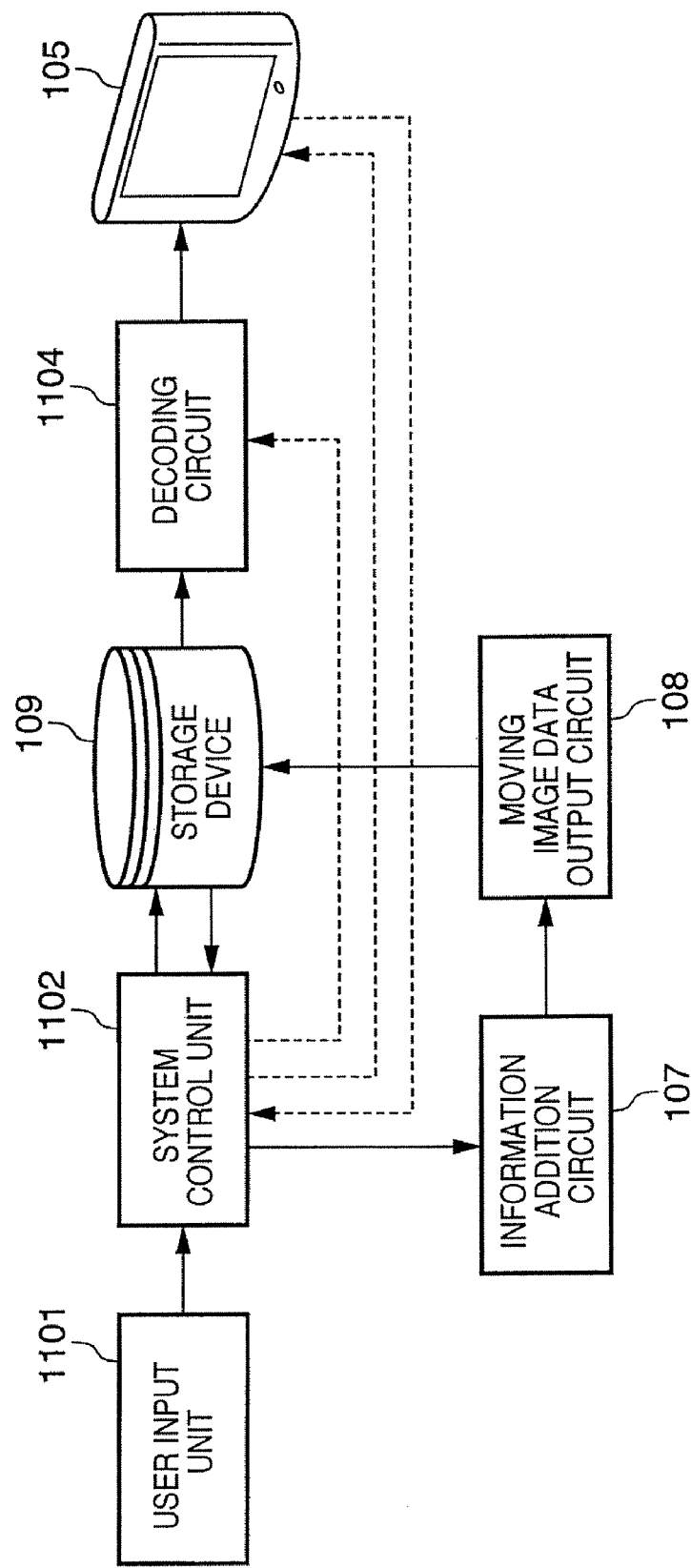
FIG. 11 is a functional block diagram showing the configuration of a moving image processing apparatus according to a second embodiment of the present invention.

FIG. 11 is a functional block diagram showing the configuration of a moving image processing apparatus according to a second embodiment of the present invention.

The user, with a selection from a user input unit 1101, via a system control unit 1102, can select moving image data (content) to be displayed in the display unit 105 from the moving image data (content) stored in the storage device 109. As a selection method, for example, it is possible to display in the display unit 105 both or either one of a title and thumbnail of content stored in the storage device 109, and operate the user input unit 1101 to select any content from within this display.

The encoded data corresponding to the selected content is read from the storage device 109 by control of the system control unit 1102, and input to a decoding circuit 1104. The decoding circuit 1104 is a circuit forming a pair with the code compression circuit 102 in FIG. 1, and is capable of decoding encoded data that has been compression encoded by the code compression circuit 102. A moving image signal that has been decoded by the decoding circuit 1104 is input to the display unit 105, and the display unit 105 performs moving image display based on the input moving image signal. A display example based on moving image data input to the display unit 105 is shown in FIGS. 9A to 9D. FIGS. 9A to 9D show each frame of a moving image, and time passes from FIG. 9A toward FIG. 9D.

For each frame of the moving image signal shown in FIGS. 9A to 9D, the rotation angle ($\phi(M)$, $\phi(M+1)$, ...) of the image capturing unit 101 at the time that the image in that frame was captured is set. Also, the angle of view ($\theta$, $\theta+1$) and the timestamp (absolute time or the time that has passed since starting image capture) corresponding to each frame are set in each frame of the moving image signal as image capturing information. Here, marker information related to markers (first markers) 901 to 903 in FIGS. 9A to 9C is added to each frame of the moving image signal as metadata.

Figure 10A:
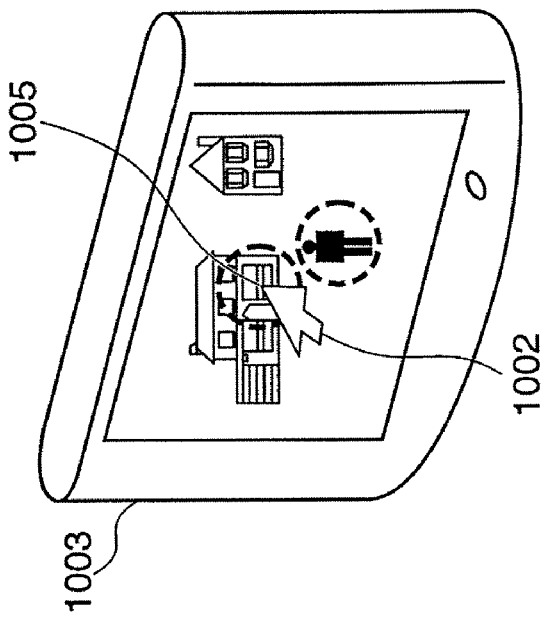
FIG. 10A shows an example of a selected frame displayed in a display unit 105.

The user can select a desired frame (picture) of the moving image displayed in the display unit 105 with the user input unit 1101, while performing an operation such as reproduction or pausing. FIG. 10A shows an example of a selected frame displayed in the display unit 105. In the selected frame shown in FIG. 10A, for example, the marker 901 (first marker) shown in FIG. 9A is displayed. On this display screen, the user can add a second marker different from the first marker to the frame by performing input on the screen with a marker pen 1006.

For example, the user can designate a region by touching one point (1004 in FIG. 10A) on the display unit 105 with the marker pen 1006, or by drawing a closed curved line as desired on the screen with the marker pen 1006. Here, the second marker is set based on the designated point or based on a region 1007.

The display unit 105 is provided with a detection unit that detects contact of a desired object such as a pressure sensor on the screen. The detection unit is configured to detect contact of the marker pen 1006 or the like on the screen, and input information (for example, coordinate information (X,Y) when the screen display is defined with XY coordinates) of the position detected on the screen to the system control unit 1102. When one point is touched on the screen of the display unit 105 with the marker pen 1006, designating that one point on the screen, the coordinate information of the designated point is output to the system control unit 1102.

After receiving the coordinate information, the system control unit 1102, using as a designated region the region enclosed by a circle with a radius defined as desired and having the designated point as the center of the circle, calculates the center point coordinates for each frame, and outputs information of the coordinates of the calculated center point, the radius, and the like to the information addition circuit 107.

The information of the coordinates of the calculated center point, the radius, and the like constitutes second marker information for displaying the second marker.

After receiving the second marker information related to the second marker, the information addition circuit 107 converts the second marker information to metadata in the same manner as in the first embodiment. Then, the moving image data output circuit 108 adds the information converted from the second marker information to each frame corresponding to the moving image data selected by the user, which is encoded data stored in the storage device 109.

The metadata related to the second marker is added to all of the frames including an image of the area in which the second marker was designated. The encoded data to which the metadata has been added is decoded in the decoding circuit 1104, and when display is performed in the display unit 105, in the display of each frame to which metadata has been added, the first marker and the second marker are displayed. For example, in each frame of the moving image data including the region 1007 designated in FIG. 10A, a second marker (904, 905, 906) is additionally displayed in FIGS. 9E, 9F, and 9G.

In the frame shown in FIG. 9D, because regions related to a first marker and a second marker are not included, a first and second marker are not displayed in the corresponding frame 9H.

In the above description, designation of a second marker point by designating a point on the screen with the marker pen 1006 was described. On the other hand, when a closed curve is drawn on the screen of the display unit 105 with the marker pen 1006, the system control unit 1102 receives drawing information related to the closed region, and with a desired mathematical function, it is possible to calculate the center point of the region enclosed by the closed curved line. The system control unit 1102 is also capable of setting a designated region enclosed by a circle having a radius defined as desired based on the calculated center point, same as when a single point has been designated.

Figure 10B:
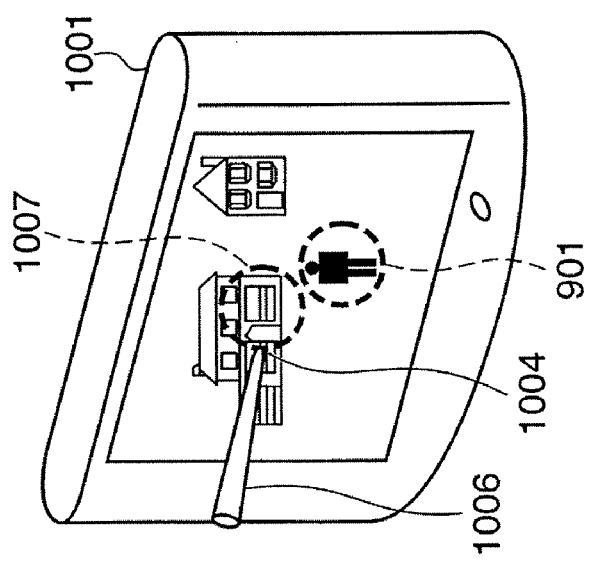
FIG. 10B shows a state in which a mouse cursor 1002 has been moved to a desired position on a screen using an input unit.

The user can also input coordinates (numerical values) corresponding to a desired position on the screen using a desired input unit (such as a keyboard or mouse) other than the marker pen 1006 as an input unit for the screen display of the display unit 105. FIG. 10B shows a state in which a mouse cursor 1002 has been moved to a desired position (1005) on the screen using an input unit such as a keyboard or mouse. In this state, the user may, by performing an operation such as right-clicking a mouse, cause a designation of one point (1005 in FIG. 10B) on the screen to be input to the system control unit 1102.

In the present embodiment, a marker is newly added to each frame of recorded moving image data, and information related to a newly added marker can be associated with a marker that is already recorded. The number of markers to be added is not limited to two markers; it is possible to likewise designate a plurality of markers (e.g., third marker, fourth marker, ...), and add marker information. The shape of a displayed marker is not limited to a circular shape; for example, a marker with a rectangular shape may also be used.

As described above, according to the present embodiment, based on individual image frames of a moving image and position information such as the direction and angle of view when those image frames were captured, it is possible to associate a specific region in space throughout the entire moving image.

Third Embodiment

Next is a description of a configuration in which, as a third embodiment of the present invention, a recorded marker, corresponding to image capturing information of recorded moving image data including a marker, is displayed in a live video image captured by the image capturing unit 101.

Figure 12:
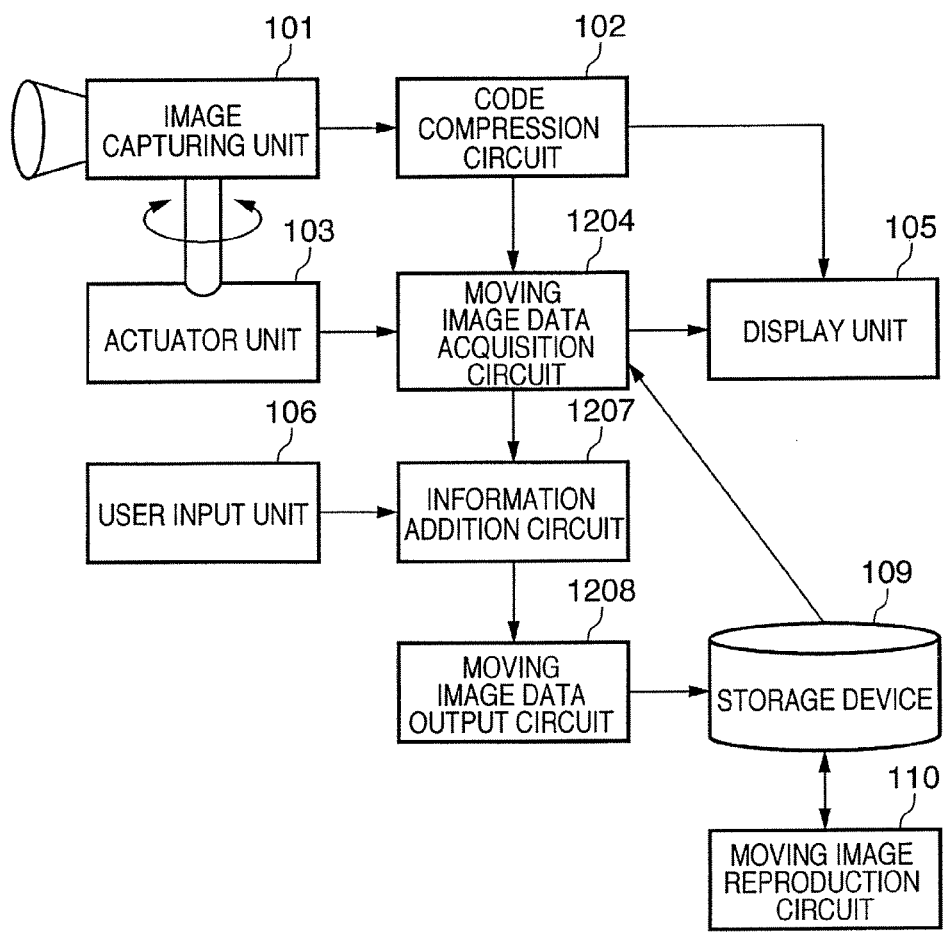
FIG. 12 is a block diagram showing the functional configuration of a moving image processing apparatus according to a third embodiment of the present invention.

FIG. 12 is a block diagram showing the functional configuration of a moving image processing apparatus according to the third embodiment. The same constituent elements as in FIG. 1 described in the first embodiment are given the same reference numerals.

A moving image data acquisition circuit 1204 acquires image capturing information of the image capturing unit 101 from the actuator unit 103. Here, the image capturing information acquired by the moving image data acquisition circuit 1204 from the actuator unit is information related to image capturing position information, angle of view, rotation angle, and the like related to the live image captured by the image capturing unit 101.

The information addition circuit 107 adds moving image data to the marker information (for example, 404 in FIG. 4) designated with the user input unit 106. Then, the moving image data output circuit 108 outputs the moving image data 302 as shown in FIG. 3 to the storage device 109.

The moving image data acquisition circuit 1204 according to the present embodiment is capable of reading moving image data to which image capturing information and marker information has been added from the storage device 109. The moving image data acquisition circuit 1204, based on the image capturing position information acquired from the actuator unit 1203 and the marker information added to the recorded moving image data, judges whether the image capturing position and the marker are in a positional relationship such that the recorded marker is included in the live video image. When the recorded marker is included in the live video image, position information corresponding to the marker is specified in the live video image. The moving image data acquisition circuit 1204, for example, specifies the position information (positional relationship) of the recorded moving image data and the live video image such that their display position coordinates when displayed on the display unit 105 are aligned.

When the moving image acquisition circuit 1204 has judged that the recorded marker is included in the live video image, an information addition circuit 207 adds marker information for displaying the marker in the live video image based on the specified marker position information. The moving image data output circuit 1208 generates moving image data of the live image to which the marker information has been added, and outputs the generated data to the storage device 109.

The moving image reproduction circuit 110, when reading and reproducing moving image data from the storage device 109, is capable of reproducing a marker display previously recorded with that marker display reflected in moving image data newly recorded as a live video image.

For example, assume that the rotation angle φ(M) has been acquired from the marker information recorded in the moving image data file 302 as shown in FIG. 3. If the rotation angle φ and the angle of view θ of a particular frame in the live video image are known, the moving image data acquisition circuit 1204 judges whether the rotation angle φ(M), which is marker position information, is included in the image capturing range (φ+θ) of that frame. If the marker is included in the image capturing range, the information addition circuit 1207 adds the marker information of the marker 305 to the live video image.

As described above, according to the present embodiment, based on individual image frames of a moving image and position information such as the direction and angle of view when those image frames were captured, it is possible to associate a specific region in space throughout the entire moving image.

Other Embodiments

The object of the present invention is of course also attained by providing a system or an apparatus with a storage medium on which is recorded a software program that realizes the functions of the embodiments described above. Moreover, the object of the present invention is of course also attained by a computer (or a CPU or MPU) of a system or an apparatus reading and executing a program code stored on a storage medium.

In this case, the program code read from the storage medium realizes the functions of the embodiments described above, and the present invention is configured from the storage medium on which that program code is stored.

As a storage medium for supplying the program code, it is possible to use, for example, a flexible disk, a hard disk, an optical disk, a magnetic optical disk, a CD-ROM, a CD-R, a non-volatile memory card, a ROM, or the like.

The functions of the embodiments described above are realized by a computer executing the read program code. Further, the present invention of course also encompasses a case in which an OS (operating system) or the like operating on a computer performs all or a portion of the actual processing based on instructions of the program code, and the embodiments described above are realized by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-128580, filed May 2, 2006, which is hereby incorporated by reference herein in its entirety.

What is claimed is:

1. An image processing apparatus, comprising:
   an acquiring unit configured to acquire a first image frame captured by an image capturing unit, first image capturing information related to a direction of the image capturing unit for capturing the first image frame, a second image frame which is captured by the image capturing unit and has an order of image capturing earlier than an order of image capturing of the first image frame, and second image capturing information related to a direction of the image capturing unit for capturing the second image frame;
   a designating unit configured to designate a display position of a marker in the first image frame acquired by the acquiring unit; and
   a creating unit configured to create a moving image data file including the first and second image frames, the first and second image capturing information, identification information for identifying the first image frame in which the display position of the marker is designated by the designating unit, and the display position of the marker in the first image frame designated by the designating unit so that an apparatus which reproduces the moving image data file can determine a display position of the marker in the second image frame captured earlier than the first image frame based on the display position of the marker in the first image frame designated by the designation unit, the first image capturing information, and the second image capturing information, wherein the identification information is included in a header of the moving image data file created by the creating unit.

2. The apparatus according to claim 1, further comprising a reproduction unit configured to reproduce the second image frame in which the marker is added at the display position determined based on the display position of the marker in the first image frame designated by the designating unit and the first and second image capturing information.

3. The apparatus according to claim 2, wherein the reproduction unit reproduces the marker of a first size in the first image frame and reproduces the marker of a second size smaller than the first size in the second image frame in case that an angle of view corresponding to the second image frame is wider than an angle of view corresponding to the first image frame.

4. The apparatus according to claim 1, wherein the first and second image capturing information include information related to a rotation angle and an angle of view of the image capturing unit.

5. An image processing method, comprising:
an acquiring step of acquiring a first image frame captured by an image capturing unit, first image capturing information related to a direction of the image capturing unit for capturing the first image frame, a second image frame which is captured by the image capturing unit and has an order of image capturing earlier than an order of image capturing of the first image frame, and second image capturing information related to a direction of the image capturing unit for capturing the second image frame;
a designating step of designating a display position of a marker in the first image frame acquired by the acquiring step; and
a creating step of creating a moving image data file including the first and second image frames, the first and second image capturing information, identification information for identifying the first image frame in which the display position of the marker is designated by the designating step, and the display position of the marker in the first image frame designated by the designating step so that an apparatus which reproduces the moving image data file can determine a display position of the marker in the second image frame captured earlier than the first image frame based on the display position of the marker in the first image frame designated by the designating step, the first image capturing information, and the second image capturing information,
wherein the identification information is included in a header of the moving image data file created by the creating step.

6. The method according to claim 5, further comprising a reproduction step of reproducing the second image frame in which the marker is added at the display position determined based on the display position of the marker in the first image frame designated by the designating step and the first and second image capturing information.

7. The method according to claim 6, wherein the marker of a first size is reproduced in the first image frame and the marker of a second size smaller than the first size is reproduced in the second image frame in the reproduction step in case that an angle of view corresponding to the second image frame is wider than an angle of view corresponding to the first image frame.

8. The method according to claim 5, wherein the first and second image capturing information include information related to a rotation angle and an angle of view of the image capturing unit.

9. A non-transitory computer-readable storage medium which stores a computer program for causing a computer to execute an image processing method, the method comprising:
an acquiring step of acquiring a first image frame captured by an image capturing unit, first image capturing information related to a direction of the image capturing unit for capturing the first image frame, a second image frame which is captured by the image capturing unit and has an order of image capturing earlier than an order of image capturing of the first image frame, and second image capturing information related to a direction of the image capturing unit for capturing the second image frame;
a designating step of designating a display position of a marker in the first image frame acquired by the acquiring step; and
a creating step of creating a moving image data file including the first and second image frames, the first and second image capturing information, identification information for identifying the first image frame in which the display position of the marker is designated by the designating step, and the display position of the marker in the first image frame designated by the designating step so that an apparatus which reproduces the moving image data file can determine a display position of the marker in the second image frame captured earlier than the first image frame based on the display position of the marker in the first image frame, the first image capturing information, and the second image capturing information,
wherein the identification information is included in a header of the moving image data file created by the creating step.

10. The storage medium according to claim 9, further comprising a reproduction step of reproducing the second image frame in which the marker is added at the display position determined based on the display position of the marker in the first image frame designated by the designating step and the first and second image capturing information.

11. The storage medium according to claim 10, wherein the marker of a first size is reproduced in the first image frame and the marker of a second size smaller than the first size is reproduced in the second image frame in the reproduction step in case that an angle of view corresponding to the second image frame is wider than an angle of view corresponding to the first image frame.

12. The storage medium according to claim 9, wherein the first and second image capturing information include information related to a rotation angle and an angle of view of the image capturing unit.

* * * * *